(12) United States Patent
Bourget

(10) Patent No.: US 6,575,260 B2
(45) Date of Patent: Jun. 10, 2003

(54) MOTORCYCLE HAVING JACK SHAFT TO ACCOMMODATE WIDE REAR TIRE

(76) Inventor: Joseph Roger Bourget, 5009 W. Greenway, Glendale, AZ (US) 85306

( * ) Notice: Subject to any disclaimer, the term of this patent is extended or adjusted under 35 U.S.C. 154(b) by 0 days.

(21) Appl. No.: 09/777,747

(22) Filed: Feb. 6, 2001

(65) Prior Publication Data

US 2002/0104702 A1 Aug. 8, 2002

(51) Int. Cl.[7] .................................................. B62M 7/00
(52) U.S. Cl. ....................................................... 180/227
(58) Field of Search ................................ 180/227, 219, 180/230

(56) References Cited

U.S. PATENT DOCUMENTS

| | | | | |
|---|---|---|---|---|
| 3,756,338 A | * | 9/1973 | Goodridge | 180/219 |
| 3,937,291 A | * | 2/1976 | Hanagan | 180/220 |
| 3,954,145 A | * | 5/1976 | Nesbit | 180/230 |
| 4,267,898 A | * | 5/1981 | Wheaton | 180/205 |
| 4,406,342 A | * | 9/1983 | Lacroix | 180/220 |
| 4,561,519 A | * | 12/1985 | Omori | 180/227 |
| 4,585,087 A | * | 4/1986 | Riccitelli | 180/219 |
| 4,688,816 A | * | 8/1987 | Yang | 180/230 |
| 5,487,443 A | * | 1/1996 | Thurm | 180/227 |
| 6,193,005 B1 | * | 2/2001 | Jurrens | 180/227 |
| 6,357,546 B1 | * | 3/2002 | Crosby, Jr. | 180/227 |

* cited by examiner

*Primary Examiner*—Lesley D. Morris
*Assistant Examiner*—Paul Royal, Jr.
(74) *Attorney, Agent, or Firm*—Cahill, Sutton & Thomas P.L.C.

(57) ABSTRACT

A motorcycle accommodates an enlarged rear tire by interposing an intermediate shaft between the transmission output gear and the rear wheel drive gear. The intermediate shaft includes a power input gear disposed in the same vertical plane as the transmission output gear, and a first drive belt couples the two together. The intermediate shaft also includes a power output gear disposed in the same vertical plane as the rear wheel drive gear, and a second drive belt couples the two together. The first vertical plane lies closer to the central longitudinal axis of the support frame than does the second vertical plane, allowing the center of mass of the engine and transmission to be maintained substantially along the central longitudinal axis. When incorporated into a soft-tail type motorcycle frame, the intermediate shaft is coincident with the pivot axis of the soft-tail suspension.

15 Claims, 4 Drawing Sheets

MOTORCYCLE HAVING JACK SHAFT TO ACCOMMODATE WIDE REAR TIRE

BACKGROUND OF THE INVENTION

1. Field of the Invention

The present invention relates generally to motorcycles, and more particularly, to a motorcycle having an intermediate shaft between the transmission power take-off and the rear wheel.

2. Description of the Relevant Art

Motorcycles have been used for transportation for many years and are still popular today. A particular segment of the motorcycle market consists of high-performance motorcycles having relatively large and powerful engines. Perhaps the most well-known manufacturer of such high performance motorcycles is the Harley Davidson Company of Milwaukee, Wis. Prior art motorcycles typically include a motor and a transmission. The motor crankshaft is coupled to the input of the transmission by a chain or belt drive. The output, or power take-off, of the transmission is then coupled by a second chain or belt drive directly to a sprocket on the rear wheel of the motorcycle.

Motorcycles with wider rear tires, like those installed on cars, have become very popular. However, a rear wheel using a wide tire necessarily displaces the drive gear or sprocket laterally apart from the centerline of the motorcycle frame. In turn, the drive belt or chain that extends between the transmission power take-off and the rear wheel must also be displaced off to the side, away from the centerline of the motorcycle frame, to pass around the wider tire. Manufacturers have been dealing with this problem by shifting the motor and transmission further away from the centerline of the frame, thereby keeping the power take-off of the transmission and the sprocket of the rear wheel in approximately the same plane. However, this practice shifts the center of mass of the motorcycle away from the centerline of the motorcycle frame, and tends to make the bike unbalanced and harder to control.

Accordingly, it is an object of the present invention to provide a motorcycle which accommodates wide rear tires without the need to shift the center of mass of the motorcycle away from the centerline of the motorcycle frame.

It is another object of the present invention to provide such a motorcycle which effectively eliminates the need to laterally displace the motor or transmission in order to accommodate a wide rear tire.

It is a further object of the present invention to provide such a motorcycle which accommodates a wide rear tire without impairing the handling or balance of the motorcycle.

A still further object of the present invention is to allow a motorcycle to incorporate a wide rear tire whether the motorcycle includes a so-called soft tail rear suspension or a rigid tail.

These and other objects of the present invention will become more apparent to those skilled in the art as the description of the present invention proceeds.

SUMMARY OF THE INVENTION

Briefly described, and in accordance with the preferred embodiment thereof, the present invention relates to a motorcycle having a transmission system that accommodates an enlarged rear tire through the use of an intermediate shaft, or "jack shaft". The motorcycle includes a conventional support frame for supporting a rider, an engine and a transmission mounted to such frame, and a rear wheel rotatably coupled to the rear end of the support frame. The rear wheel includes a conventional drive gear or sprocket for applying torque to the rear wheel; this rear wheel drive gear extends within a first vertical plane that is laterally spaced apart from the longitudinal axis of the support frame by a first offset distance. The engine mounted generates a turning force to propel the motorcycle, and the transmission is coupled to the engine for selectively coupling the turning force generated by the engine to a transmission output gear or power take-off.

In the present invention, the transmission output gear extends substantially within a second vertical plane spaced apart from the longitudinal axis of the support frame by a second offset distance, but wherein the second offset distance is significantly smaller than the first offset distance. In other words, the power take-off gear of the transmission is significantly closer to the central longitudinal axis of the support frame than is the rear wheel drive gear. To account for the lateral spacing difference between the power take-off gear and the rear wheel drive gear, an intermediate shaft is rotatably secured to the support frame as by a bearing assembly, the intermediate shaft including a power input gear extending substantially within the same vertical plane as the power take-off gear. The intermediate shaft also includes a power output gear that rotates together with the power input gear, but the power output gear extends substantially within the same vertical plane as does the rear drive gear. A first drive belt is engaged with, and extends between, the transmission output gear and the power input gear of the intermediate shaft. A second drive belt is engaged with, and extends between, the power output gear of the intermediate shaft and the rear wheel drive gear.

In one embodiment of the present invention, the first and second drive belts are first and second chains, respectively. In this embodiment, the transmission output gear and power input gear are sprockets that engage the first chain; the power output gear and rear wheel drive gear are also sprockets, and each engages the second chain. Alternatively, the first and second drive belts an be in the form of flexible belts each having a toothed inner surface; in this embodiment, the transmission output gear and power input gear are toothed drive belt pulleys that engage the first toothed drive belt, and the power output gear and rear wheel drive gear are also toothed drive belt pulleys that engage the second toothed drive belt.

The intermediate shaft allows the first and second drive belts to extend within spaced vertical planes, hence allowing the transmission output gear and the rear wheel drive gear to extend within such laterally spaced planes. Accordingly, there is no need to displace the center of mass of either the engine or the transmission away from the longitudinal axis of the support frame, thereby improving the handling and balance of the motorcycle.

As mentioned above, the present invention may be used with both motorcycles having oft-tail suspensions, as well as those having rigid rear suspensions. In motorcycle frames having a soft-tail suspension, the support frame includes a tail frame portion for supporting the rear wheel, wherein the tail frame portion rotatably supports the rear wheel, and is itself pivotally secured to the support frame about a tail pivot axis. The present invention may advantageously be incorporated within such a soft-tail suspension motorcycle by rotatably securing the intermediate shaft to the support frame about a rotational axis that is coincident with the tail pivot axis.

DETAILED DESCRIPTION OF THE PREFERRED EMBODIMENT

Figure 1:
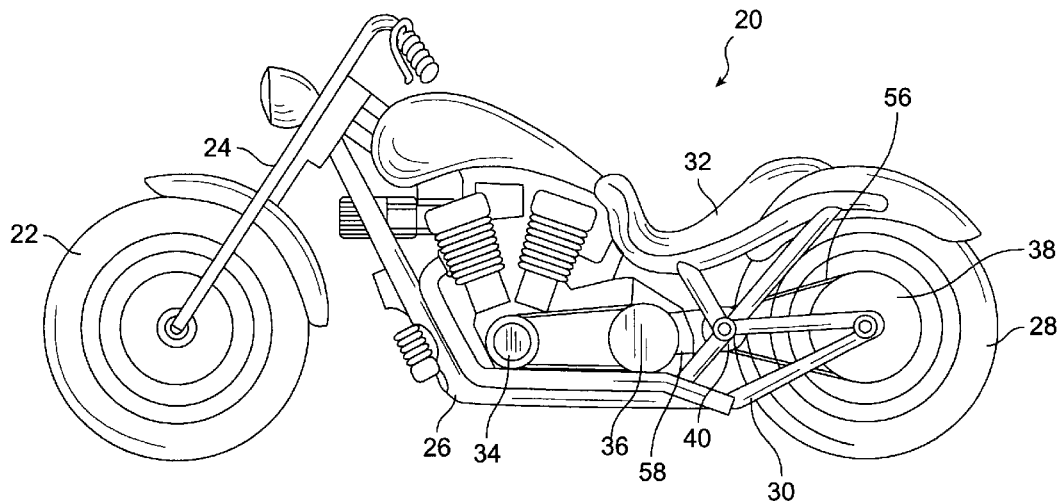
FIG. 1 is a side view of a motorcycle including an intermediate shaft, and including first and second drive belts in accordance with the present invention.
Figure 2:
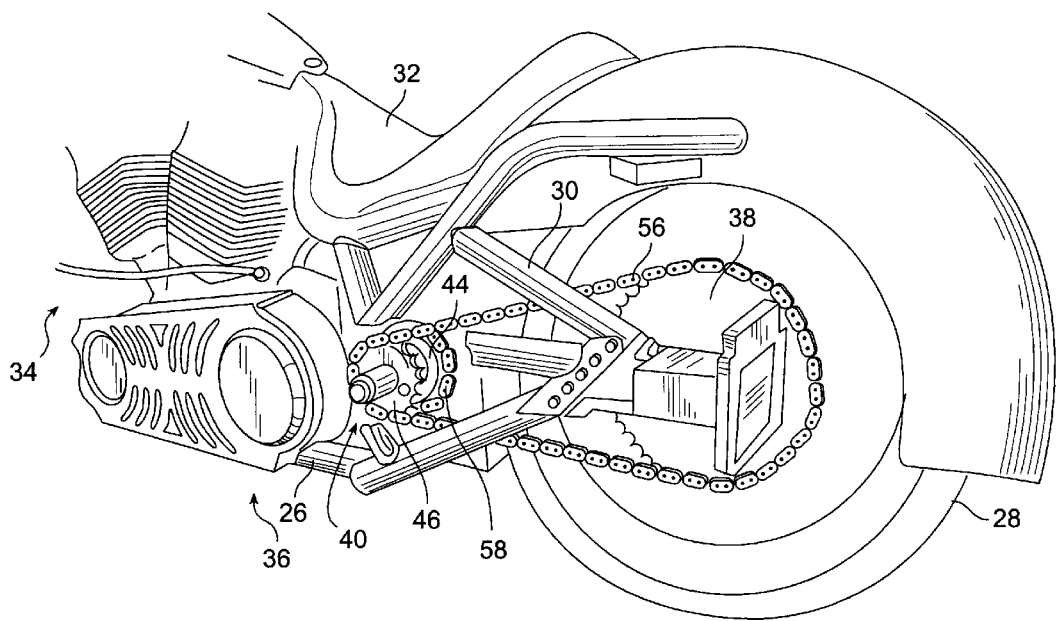
FIG. 2 is a close-up, partially cut-away, perspective view of the rear end of the motorcycle shown in FIG. 1.
Figure 3:
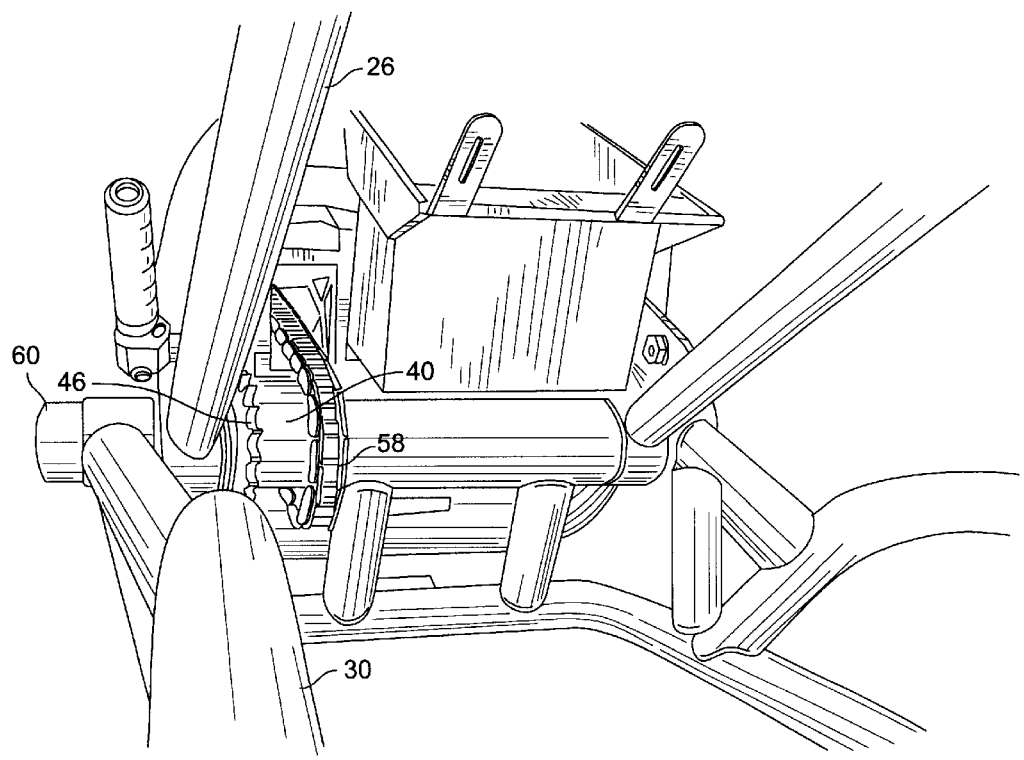
FIG. 3 is an enlarged rear view of the intermediate shaft and the tail portion of a soft-tail suspension support frame as shown in FIG. 1.

A motorcycle incorporating the present invention is designated generally by reference numeral 20 in FIG. 1. Motorcycle 20 includes a front wheel 22 supported by a front fork 24, a central tubular support frame 26, a rear wheel 28, and a soft tail suspension, or swing arm frame, 30 for pivotally securing rear wheel 28 to central support frame 26. Central support frame may be constructed from tubular frame members formed of aircraft billet aluminum tubing of the type designated 0.188 Wall Dom T6 6061 aircraft billet aluminum tubing. Rear wheel 38 is, of course, supported by suspension frame 30 in a manner which permits rear wheel 28 to rotate. Seat 32 is secured to the upper portion of central support frame 26 for supporting a rider. It will be noted that central support frame 26 extends along a longitudinal axis from its front end (near front wheel 22) to its rear end (near rear wheel 28). Central support frame 26 also supports a motor 34 for generating a turning force to propel the motorcycle, and a transmission 36 coupled to motor 34 for selectively coupling the turning force generated by motor 34 to a transmission output gear not shown), in the usual manner.

Rear wheel 28 includes a rear wheel drive gear, or sprocket, 38 for applying torque to the ear wheel. Ordinarily, a chain or belt would extend between the transmission output gear (not shown) of transmission 36 and rear wheel drive gear 38 to directly couple the two together. However, as described above, the use of a relatively wide rear tire 28 forces rear wheel drive gear 38 to be disposed further away from the central longitudinal axis of central support frame 26. Others have, in the past, shifted motor 34 and transmission 36 in the same lateral direction to maintain the transmission output gear (not shown) in the same relative vertical plane as rear wheel drive gear 38. As indicated above, however, this practice tends to make the motorcycle unbalanced by shifting weight away from the central axis of the motorcycle.

Figure 4:
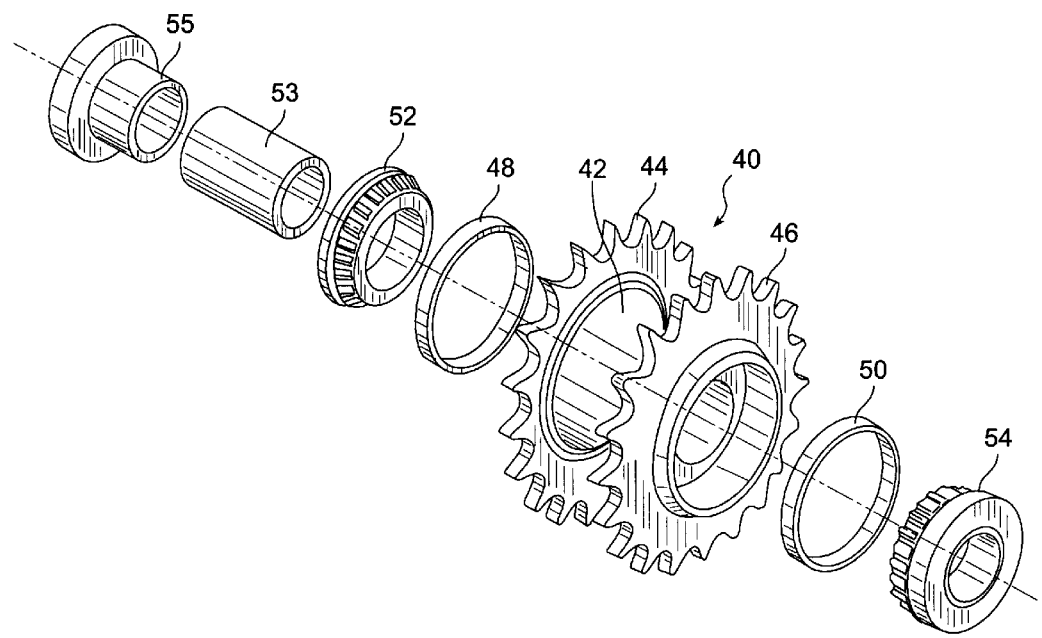
FIG. 4 is an exploded perspective view of the intermediate shaft, as well as a bearing assembly used to rotatably secure the intermediate shaft to the motorcycle support frame.
Figure 5:
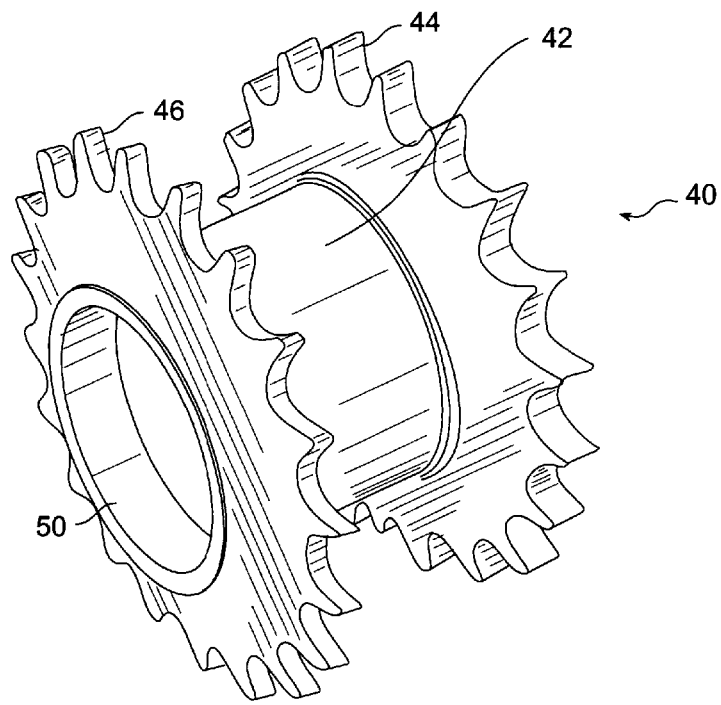
FIG. 5 is an enlarged perspective view of the intermediate shaft.

In practicing the present invention, an intermediate shaft assembly, or "jack shaft" 40, is interposed between transmission 36 and rear wheel drive gear 38 in order to permit rear wheel drive gear 38 to extend further away, in the lateral direction, from the central longitudinal axis of support frame 26. As shown best in FIGS. 2–5, intermediate shaft 40 includes a hollow central cylinder 42 having a power input gear, or sprocket, 44 and a power output gear, or sprocket, 46 extending from opposing ends thereof. Intermediate shaft 40 is rotatably secured to the central support frame 26, and a pair of bearing races 48 and 50 are inserted into the hollows of power input gear 44 and power output gear 46, respectively, for such purpose. As indicated in FIG. 5, bearing races 48 and 50 are engaged by roller bearing assemblies 52 and 54 to permit intermediate shaft 40 to freely rotate relative to central support frame 26. Internal spacer tube 53 extends inside the hollow of intermediate shaft 40 and maintains proper spacing between the two roller bearing assemblies 52 and 54. Also shown in FIG. 4 is an end spacer 55 which pushes against roller bearing assembly 52, and which spaces the end of intermediate shaft 40 apart from central support frame 26.

Power output gear 46 of intermediate shaft 40 extends substantially within the same vertical plane as does rear wheel drive gear 38. Within the embodiment illustrated in FIGS. 1–5, a drive chain 56 is engaged over both power output gear 46 and rear wheel drive gear 38. Thus, power output gear 46, rear wheel drive gear 38, and drive chain 56 all extend substantially within a first vertical plane that is a first offset distance from the central longitudinal axis of central support frame 26.

While the transmission output gear of transmission 36 is hidden from view in the accompanying patent drawings, the transmission output gear extends substantially within the same vertical plane as does power input gear 44 of intermediate shaft 40. This vertical plane is a second offset distance away from the central longitudinal axis of central support frame 26. Drive chain 58 is engaged over both the transmission output gear (not shown) and power input gear 44 of intermediate shaft 40. Thus, the transmission output gear, drive chain 58, and power input gear 44 all lie substantially within the second vertical plane that is laterally spaced from the central longitudinal axis of central support frame 26 by the aforementioned second offset distance. This second offset distance is smaller than the aforementioned first offset distance. By varying the length of intermediate shaft 40, and hence, the distance between power input gear 44 and power output gear 46, a motorcycle manufacturer can easily account for rear tires of various widths. The applicant has found that a separation distance of from two-four inches between power input gear 44 and power output gear 46 is usually sufficient to accommodate wider rear tires typically being installed on motorcycles today.

Figure 6:
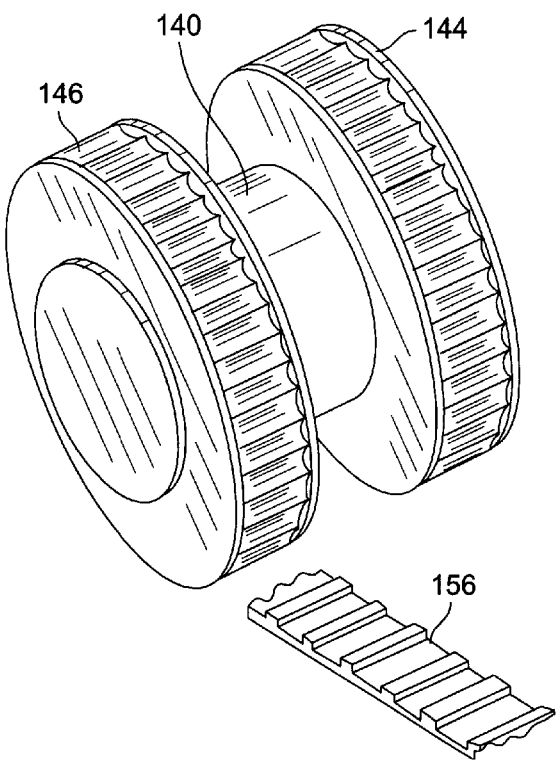
FIG. 6 is an enlarged perspective view of an alternate embodiment of the intermediate shaft adapted to engage a pair of toothed rubber drive belts.
Figure 7:
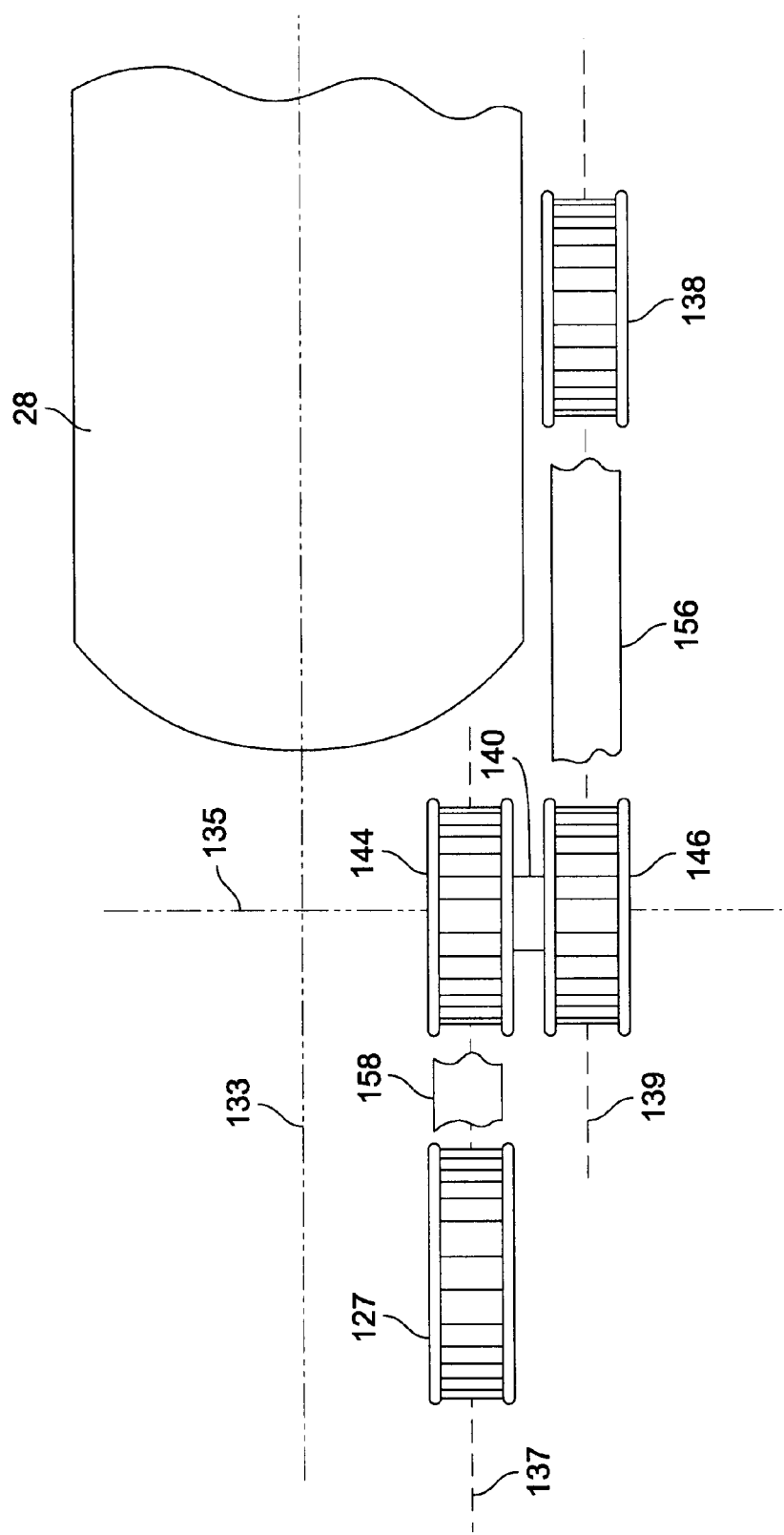
FIG. 7 is a plan view of an alternate embodiment of the present invention using toothed drive pulleys and toothed rubber drive belts.

In the embodiment of the present invention described thus far relative to FIGS. 1–5, sprocket gears are engaged by chains to transmit torque from transmission 36 to rear wheel 28. However, those skilled in the art will appreciate that drive chains 56 and 58 may be replaced by flexible rubber drive belts. For example, suitable power transmission drive belts may be obtained from The Gates Rubber Company of Denver, Colorado under the brand name "POLY CHAIN". These drive belts have a toothed inner surface adapted to be engaged by toothed drive pulleys. Referring to FIGS. 6 and 7, intermediate shaft 140 includes a power input drive pulley 144 adapted to engage a first toothed drive belt 158 that also engages a similar toothed drive pulley 127 provided at the output of transmission 36. Likewise, intermediate shaft 140 includes a power output drive pulley 146 adapted to engage a second toothed drive belt 156 which also engages a similar toothed drive pulley 138 provided on rear wheel 28 in substitution for rear wheel drive gear 38 of FIG. 2. Within FIG. 7, dashed line 133 designates the central longitudinal axis of the motorcycle support frame 26, while dashed line 135 designates the axis of rotation of intermediate shaft 140. Also within FIG. 7, dashed line 137 represents the vertical plane in which transmission output gear 127 and power input pulley 144 lie, while dashed line 139 represents the vertical plane in which power output pulley 146 and rear wheel drive pulley 138 lie.

As mentioned above, motorcycle 20 may include a soft-tail rear suspension frame 30 that is pivotally connected to central support frame 26. Shock absorbers (not shown) maintain rear suspension frame 30 in proper nominal angular relationship relative to central support frame 26, while permitting rear suspension frame 30 to pivot in response to bumps in the road. The details of such rear suspension apparatus are set forth in greater detail in applicant's U.S. Pat. No. 5,975,230, the disclosure of which is incorporated herein by reference. Ideally, the axle (see 60 in FIG. 3) that pivotally secures rear suspension frame 30 to central support frame 26 passes through intermediate shaft 40, and hence the pivot axis about which the rear suspension frame 30 pivots is coincident with the axis of intermediate shaft 40. In this manner, the distance between the transmission output gear (not shown) and the power input gear 44 always remains constant, and the distance between power output gear 46 and rear wheel drive gear 38 always remains constant, even though the rear wheel may be pivoting up and down due to bumps in the road.

Since intermediate shaft 40 serves to laterally translate the drive plane of the transmission outwardly away from the central longitudinal axis of central support frame 26, motor 34 and transmission 36 may be mounted to central support frame 26 in a manner which maintains the motor's center of mass, and the transmission's center of mass, located along the central longitudinal axis of central support frame 26. This improves the balance and handling of the motorcycle, and enhances the rider's control over the motorcycle.

If the present invention is used with a motorcycle having a rigid rear frame (i.e., not a oft-tail suspension), then adjustment screws can be added, if desired, for adjusting the distance of the intermediate shaft 40 from transmission 36 in order to adjust the tension on drive chain 58 extending therebetween. Another adjustment mechanism may be provided near the axle of rear wheel 28 to allow for adjustment of the distance between intermediate shaft 40 and the axle of rear tire 28 in order to adjust the tension of drive chain 56 extending therebetween.

Those skilled in the art will now appreciate that an improved motorcycle has been described which easily and safely accommodates wide rear tires without the need to shift the center of mass of the motorcycle away from the centerline of the motorcycle frame. The motorcycle structure described above eliminates any requirement for laterally displacing the motor or transmission in order to accommodate a wide rear tire. Moreover, the intermediate shaft assembly described above works equally well with both motorcycles having a soft-tail suspension and those having a rigid tail end. While the present invention has been described with respect to a preferred embodiment thereof, such description is for illustrative purposes only, and is not to be construed as limiting the scope of the invention. Various modifications and changes may be made to the described embodiment by those skilled in the art without departing from the true spirit and scope of the invention as defined by the appended claims.

I claim:

1. A motorcycle having a transmission system that accommodates an enlarged rear tire, the motorcycle comprising in combination:
   a. a support frame for supporting a rider, the support frame extending along a longitudinal axis between opposing front and rear ends;
   b. a rear wheel rotatably coupled to the rear end of the support frame, the rear wheel including a rear wheel drive gear for applying torque to the rear wheel, the rear wheel drive gear extending substantially in a first vertical plane spaced apart from the longitudinal axis of the support frame by a first offset distance;
   c. an engine mounted to the support frame for generating a turning force to propel the motorcycle;
   d. a transmission mounted to the support frame and coupled to the engine for selectively coupling the turning force generated by the engine to a transmission output gear, the transmission output gear extending substantially in a second vertical plane spaced apart from the longitudinal axis of the support frame by a second offset distance, the second offset distance being smaller than the first offset distance;
   e. an intermediate shaft rotatably secured to the support frame and disposed generally between the transmission output gear and the rear wheel drive gear, the intermediate shaft including a power input gear, the power input gear extending substantially in said second vertical plane and spaced apart from the longitudinal axis of the support frame by said second offset distance, said intermediate shaft also including a power output gear that rotates together with the power input gear, the power output gear extending substantially in said first vertical plane and spaced apart from the longitudinal axis of the support frame by said first offset distance;
   f. a first drive belt coupling the transmission output gear to the power input gear of the intermediate shaft; and
   g. a second drive belt coupling the power output gear of the intermediate shaft to the rear wheel drive gear.

2. The motorcycle recited by claim 1 wherein said first and second drive belts are first and second chains, respectively, wherein said transmission output gear and power input gear are sprockets that engage the first chain, and wherein said power output gear and rear wheel drive gear are sprockets that engage the second chain.

3. The motorcycle recited by claim 1 wherein said first and second drive belts are first and second flexible belts each having a toothed inner surface, said transmission output gear and power input gear are toothed drive belt pulleys that engage the first toothed drive belt, and wherein said power output gear and rear wheel drive gear are toothed drive belt pulleys that engage the second toothed drive belt.

4. The motorcycle recited by claim 1 wherein the intermediate shaft is rotatably secured to the support frame by a bearing assembly.

5. The motorcycle recited by claim 1 wherein the support frame includes a tail frame portion for supporting the rear wheel, the tail frame portion being pivotally secured to the support frame about a tail pivot axis, and the rear wheel being rotatably secured to the tail frame portion.

6. The motorcycle recited by claim 5 wherein the intermediate shaft is rotatably secured to the support frame about a rotational axis that is coincident with said tail pivot axis.

7. The motorcycle recited by claim 1 wherein the engine and transmission each have a center of mass, wherein the engine's center of mass is located along the longitudinal axis of the support frame, and wherein the transmission's center of mass is located along the longitudinal axis of the support frame.

8. The motorcycle recited by claim 1 wherein the intermediate shaft is located generally within the support frame.

9. A motorcycle having a transmission system that accommodates an enlarged rear tire, the motorcycle comprising in combination:
   a. a support frame for supporting a rider, the support frame extending along a longitudinal axis between opposing front and rear ends;

b. a rear wheel rotatably coupled to the rear end of the support frame, the rear wheel including a rear wheel drive gear for applying torque to the rear wheel, the rear wheel drive gear extending substantially in a first vertical plane spaced apart from the longitudinal axis of the support frame by a first offset distance;

c. an engine mounted to the support frame for generating a turning force to propel the motorcycle;

d. a transmission mounted to the support frame and coupled to the engine for selectively coupling the turning force generated by the engine to a transmission output gear, the transmission output gear extending substantially in a second vertical plane spaced apart from the longitudinal axis of the support frame by a second offset distance, the second offset distance being smaller than the first offset distance; and e. an intermediate shaft located generally within the support frame and rotatably secured to the support frame, the intermediate shaft including a power input gear, the power input gear extending substantially in said second vertical plane and spaced apart from the longitudinal axis of the support frame by said second offset distance, said intermediate shaft also including a power output gear that rotates together with the power input gear, the power output gear extending substantially in said first vertical plane and spaced apart from the longitudinal axis of the support frame by said first offset distance.

10. The motorcycle recited by claim 9 wherein the intermediate shaft is disposed generally between the transmission output gear and the rear wheel drive gear.

11. The motorcycle recited by claim 9 wherein the intermediate shaft is disposed generally between the transmission output gear and the rear wheel drive gear, further including:

f. a first drive belt coupling the transmission output gear to the power input gear of the intermediate shaft; and g. a second drive belt coupling the power output gear of the intermediate shaft to the rear wheel drive gear.

12. A motorcycle having a transmission system that accommodates an enlarged rear tire, the motorcycle comprising in combination:

a. a support frame for supporting a rider, the support frame extending along a longitudinal axis between opposing front and rear ends, and wherein the support frame includes a tail frame portion for supporting a rear wheel, the tail frame portion being pivotally secured to the support frame about a tail pivot axis, and the rear wheel being rotatably secured to the tail frame portion;

b. a rear wheel drive gear for applying torque to the rear wheel, the rear wheel drive gear extending substantially in a first vertical plane spaced apart from the longitudinal axis of the support frame by a first offset distance;

c. an engine mounted to the support frame for generating a turning force to propel the motorcycle;

d. a transmission mounted to the support frame and coupled to the engine for selectively coupling the turning force generated by the engine to a transmission output gear, the transmission output gear extending substantially in a second vertical plane spaced apart from the longitudinal axis of the support frame by a second offset distance, the second offset distance being smaller than the first offset distance; and e. an intermediate shaft rotatably secured to the support frame about a rotational axis that is coincident with said tail pivot axis, the intermediate shaft including a power input gear, the power input gear extending substantially in said second vertical plane and spaced apart from the longitudinal axis of the support frame by said second offset distance, said intermediate shaft also including a power output gear that rotates together with the power input gear, the power output gear extending substantially in said first vertical plane and spaced apart from the longitudinal axis of the support frame by said first offset distance.

13. The motorcycle recited by claim 12 wherein the intermediate shaft is located generally within the support frame.

14. The motorcycle recited by claim 13 further including:

f. a first drive belt coupling the transmission output gear to the power input gear of the intermediate shaft; and g. a second drive belt coupling the power output gear of the intermediate shaft to the rear wheel drive gear.

15. The motorcycle recited by claim 12 wherein the intermediate shaft is disposed generally between the transmission output gear and the rear wheel drive gear.

* * * * *

(12) INTER PARTES REEXAMINATION CERTIFICATE (0072nd)
United States Patent
Bourget

(10) Number: US 6,575,260 C1
(45) Certificate Issued: Jun. 9, 2009

(54) MOTORCYCLE HAVING JACK SHAFT TO ACCOMMODATE WIDE REAR TIRE

(76) Inventor: Joseph Roger Bourget, 5009 W. Greenway, Glendale, AZ (US) 85306

Reexamination Request:
No. 95/000,061, Dec. 1, 2004

Reexamination Certificate for:
Patent No.: 6,575,260
Issued: Jun. 10, 2003
Appl. No.: 09/777,747
Filed: Feb. 6, 2001

(51) Int. Cl.
B62M 7/00 (2006.01)

(52) U.S. Cl. .................................................. 180/227
(58) Field of Classification Search ............... 180/227, 180/229, 219, 230
See application file for complete search history.

(56) References Cited
U.S. PATENT DOCUMENTS 3,974,892 A 8/1976 Bolger
4,494,622 A 1/1985 Thompson
4,585,087 A 4/1986 Riccitelli
4,645,028 A 2/1987 Kawashima
4,650,026 A * 3/1987 Shiraishi .................. 180/227

* cited by examiner

Primary Examiner—Matthew C. Graham

(57) ABSTRACT

A motorcycle accommodates an enlarged rear tire by interposing an intermediate shaft between the transmission output gear and the rear wheel drive gear. The intermediate shaft includes a power input gear disposed in the same vertical plane as the transmission output gear, and a first drive belt couples the two together. The intermediate shaft also includes a power output gear disposed in the same vertical plane as the rear wheel drive gear, and a second drive belt couples the two together. The first vertical plane lies closer to the central longitudinal axis of the support frame than does the second vertical plane, allowing the center of mass of the engine and transmission to be maintained substantially along the central longitudinal axis. When incorporated into a soft-tail type motorcycle frame, the intermediate shaft is coincident with the pivot axis of the soft-tail suspension.

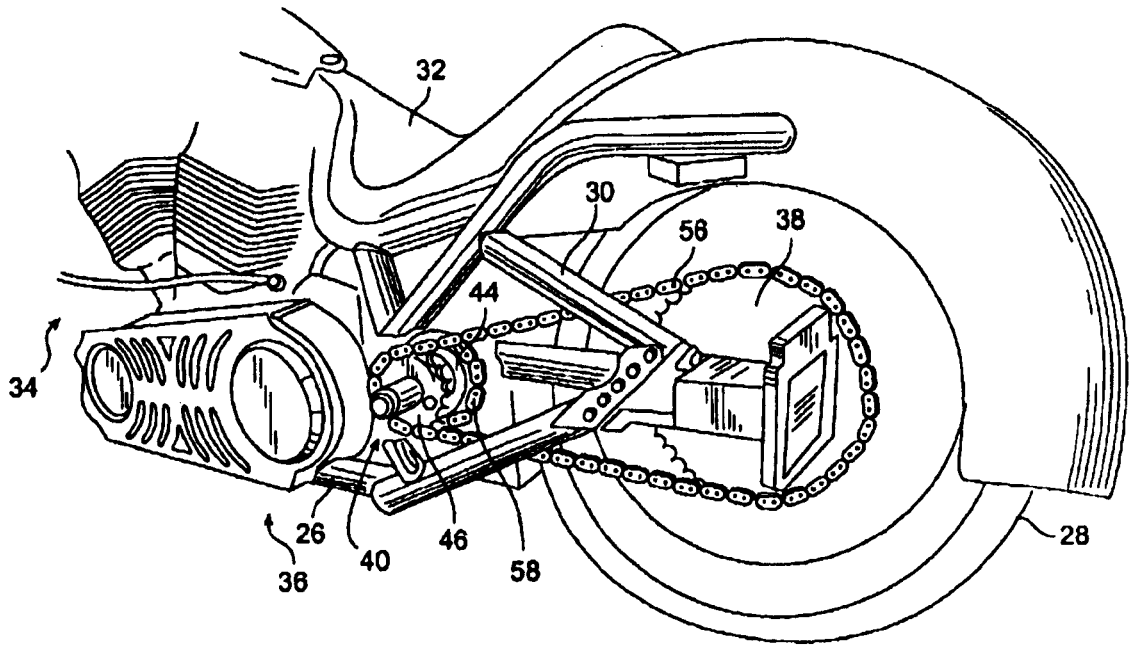

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 12–15 is confirmed.

Claims 5 and 6 are cancelled.

Claims 1 and 9 are determined to be patentable as amended.

Claims 2–4, 7, 8 and 10–11, dependent on an amended claim, are determined to be patentable.

1. A motorcycle having a transmission system that accommodates an enlarged rear tire, the motorcycle comprising in combination:
   a. a support frame for supporting a rider, the support frame extending along a longitudinal axis between opposing front and rear ends *wherein the support frame includes a tail frame portion for supporting a rear wheel, the tail frame portion being pivotally secured to the support frame about a tail pivot axis, and the rear wheel being rotatably secured to the tail frame portion*;
   b. [a rear wheel rotatably coupled to the rear end of the support frame,] the rear wheel including a rear wheel drive gear for applying torque to the rear wheel, the rear wheel drive gear extending substantially in a first vertical plane spaced apart from the longitudinal axis of the support frame by a first offset distance;
   c. an engine mounted to the support frame for generating a turning force to propel the motorcycle;
   d. a transmission mounted to the support frame and coupled to the engine for selectively coupling the turning force generated by the engine to a transmission output gear, the transmission output gear extending substantially in a second vertical plane spaced apart from the longitudinal axis of the support frame by a second offset distance, the second offset distance being smaller than the first offset distance;
   e. an intermediate shaft rotatably secured to the support frame and disposed generally between the transmission output gear and the rear wheel drive gear, *wherein the intermediate shaft is rotatably secured to the support frame about a rotational axis that is coincident with said tail pivot axis*, the intermediate shaft including a power input gear, the power input gear extending substantially in said second vertical plane and spaced apart from the longitudinal axis of the support frame by said second offset distance, said intermediate shaft also including a power output gear that rotates together with the power input gear, the power output gear extending substantially in said first vertical plane and spaced apart from the longitudinal axis of the support frame by said first offset distance;
   f. a first drive belt coupling the transmission output gear to the power input gear of the intermediate shaft; and
   g. a second drive belt coupling the power output gear of the intermediate shaft to the rear wheel drive gear.

9. A motorcycle having a transmission system that accommodates an enlarged rear tire, the motorcycle comprising in combination:
   a. a support frame for supporting a rider, the support frame extending along a longitudinal axis between opposing front and rear ends *wherein the support frame includes a tail frame portion for supporting a rear wheel, the tail frame portion being pivotally secured to the support frame about a tail pivot axis*;
   b. a rear wheel rotatably coupled to the [rear end] *to the tail frame portion* of the support frame, the rear wheel including a rear wheel drive gear for applying torque to the rear wheel, the rear wheel drive gear extending substantially in a first vertical plane spaced apart from the longitudinal axis of the support frame by a first offset distance;
   c. an engine mounted to the support frame for generating a turning force to propel the motorcycle;
   d. a transmission mounted to the support frame and coupled to the engine for selectively coupling the turning force generated by the engine to a transmission output gear, the transmission output gear extending substantially in a second vertical plane spaced apart from the longitudinal axis of the support frame by a second offset distance, the second offset distance being smaller than the first offset distance; and
   e. an intermediate shaft located generally within the support frame and rotatably secured to the support frame *about a rotational axis that is coincident with said tail pivot axis*, the intermediate shaft including a power input gear, the power input gear extending substantially in said second vertical plane and spaced apart from the longitudinal axis of the support frame by said second offset distance, said intermediate shaft also including a power output gear that rotates together with the power input gear, the power output gear extending substantially in said first vertical plane and spaced apart from the longitudinal axis of the support frame by said first offset distance.

\* \* \* \* \*